United States Patent [19]

Phillips

[11] 4,160,908
[45] Jul. 10, 1979

[54] PARTICULATE ENHANCEMENT FOR GENERATOR CONDITION MONITORS

[75] Inventor: D. Colin Phillips, Monroeville, Pa.

[73] Assignee: Westinghouse Electric Corp., Pittsburgh, Pa.

[21] Appl. No.: 873,341

[22] Filed: Jan. 30, 1978

[51] Int. Cl.² .............................................. G01T 1/18
[52] U.S. Cl. ................................ 250/381; 73/339 R; 73/384
[58] Field of Search ............... 250/381, 382, 384, 374, 250/389, 302, 303; 73/339 R

[56] References Cited

U.S. PATENT DOCUMENTS

| 3,427,880 | 2/1969 | Grobel et al. | 73/339 R |
|---|---|---|---|
| 3,428,838 | 2/1969 | Carson et al. | 310/56 |
| 3,573,460 | 4/1971 | Skala | 250/381 |
| 3,715,598 | 2/1973 | Tomlin | 250/395 |
| 3,979,353 | 9/1976 | Smith et al. | 260/33.6 EP |
| 3,979,503 | 9/1976 | Kaartinen | 423/644 |
| 4,074,137 | 2/1978 | Carson et al. | 250/381 |

Primary Examiner—Alfred E. Smith
Assistant Examiner—Carolyn E. Fields
Attorney, Agent, or Firm—G. H. Telfer

[57] ABSTRACT

In a hydrogen cooled dynamoelectric machine, an ion chamber detector monitors thermally produced particulates. The sensitivity of the ion chamber detector is improved by incorporating a particulate enhancement section upstream from the ion chamber detector. The particulate enhancement section has included therein a platinum surface over which the gaseous carrier flows increasing the number of submicron particulates entrained in the gaseous carrier.

11 Claims, 8 Drawing Figures

PARTICULATE ENHANCEMENT FOR GENERATOR CONDITION MONITORS

BACKGROUND OF THE INVENTION

1. Field of the Invention

This invention relates to an improved apparatus for detecting an overheating condition in a gas cooled dynamoelectric machine, and more particularly to an improved ion chamber apparatus for detecting the presence of submicron particulates associated with overheating of parts in a gas cooled dynamoelectric machine.

2. Description of the Prior Art

Large turbine generators are cooled by forcing a stream of a cooling fluid such a hydrogen over the heat producing parts of the machine. Because of the high flux densities present in the core of such a machine, localized overheating may cause degradation of the insulation disposed on the laminations and the end turns. Because of the potentially catastrophic consequences of such degradation, it is desirable to provide an early warning of an overheating condition.

Apparatus such as those disclosed in U.S. Pat. Nos. 3,428,838; 3,573,460 and 3,427,880 have been developed to provide early warnings of overheated conditions and are generally referred to as generator condition monitors. There have been improvements made on the reliability of the generator condition monitors and the systems in which they are used through such method as those disclosed in copending application Ser. No. 715,258 filed Aug. 17, 1976; copending application Ser. No. 792,836 filed on May 2, 1977 and copending application Ser. No. 796,576 filed on May 13, 1977. All the above referenced copending applications are assigned to the assignee of this application.

Although the apparatus described in the above named patents and applications have considerably reduced the problems associated with early detection of overheating in certain dynamoelectric machines, there is still a need for increasing the sensitivity of the basic generator condition monitor. With an improved sensitivity, an earlier warning of incipient failure within a dynamoelectric machine can be detected, which in turn permits an earlier shutdown of the machine and consequently more assurance of preventing damage to the existing insulation.

SUMMARY OF THE INVENTION

It has been determined and experimentally verified that the sensitivity of the conventional ion detector is improved, in some cases by a factor of 300%, by flowing the cooling gas with the entrained particulates therein through an enhancement chamber before passing the cooling gas into the ion chamber detector. The enhancement chamber essentially consists of an exposed surface of platinum over which the cooling gas with the entrained particulates passes. The platinum surface may be made of platinum black, platinum or of a platinum alloy having a composition of at least 30% platinum. There are numerous methods of providing an enhancement chamber with a platinum surface for the cooling gas to flow over such as a segment of platinum lined conduit or a screen placed within the conduit that conveys the cooling gas to the generator condition monitor. However, the preferred method is to use a platinum mesh which is placed in corrugated form within a small section of the generator condition monitor. This small section not only provides for enhancement of the particulates but also acts as a diffusion baffle.

The precise mechanism by which the platinum element produces the enhancement of the number of detected thermoparticulates is not fully understood but the effect has been experimentally verified to be substantial.

The foregoing and other objects, advantages and features of the invention will hereinafter appear, and for purposes of illustration, but not of limitation, an exemplary embodiment of the subject invention is shown in the appended drawings.

DESCRIPTION OF THE PREFERRED EMBODIMENT

Figure 1:
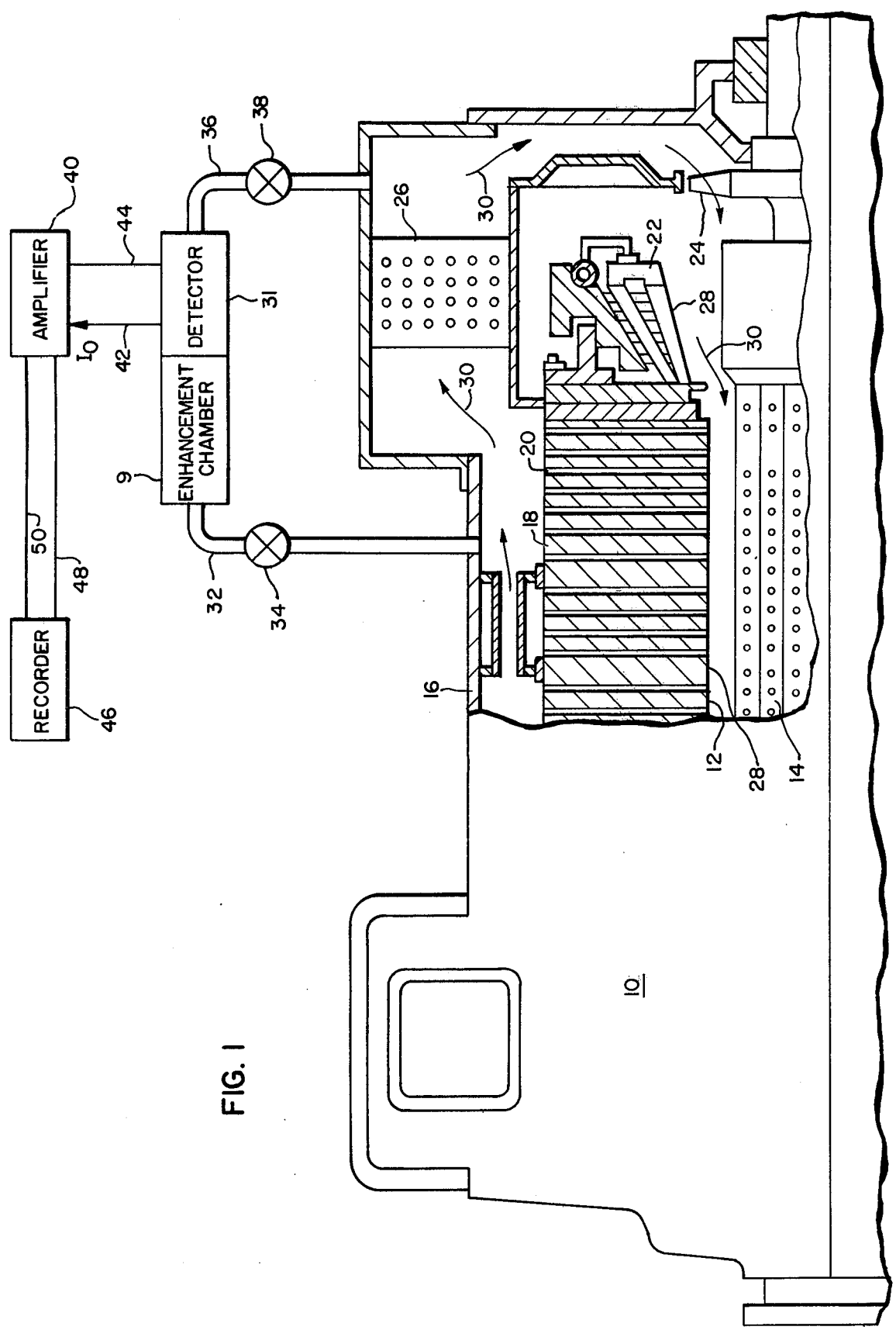
FIG. 1 is a simplified schematic view of a gas cooled dynamoelectric machine, partly in cross section, illustrating an overall arrangement of apparatus in accordance with the present invention.

The invention is shown in FIG. 1 in combination with a large gas-cooled dynamoelectric machine 10 which is typical of the type of dynamoelectric machine with which the present invention can be used to detect overheating. The dynamoelectric machine 10 includes a stator member 12 and a rotor member 14 which are supported in the usual manner within a gas tight housing 16. The stator core is comprised of magnetic laminations 18 which are separated by cooling ducts 20. The laminations are formed with slots within which a stator winding is disposed with end turn portion 22 extending at each end of the stator core. A means such as a rotor mounted fan 24 circulates a gas cooling, such as hydrogen, around the dynamoelectric machine and through the cooling ducts 20. Heat from the cooling gas is transferred away from the dynamoelectric machine 10 by means of a heat exchanger 26.

According to conventional practice, various portions of the stator core laminations 18 and end windings 22 are coated with organic materials such as epoxy and polymeric resins. These organic materials, when heated, emit submicron particulates as pyrolysis products which are both detectable and identifiable. While the coatings referred to may be insulation material which is usually associated with the machine, special "sacrificial" coatings 28 may be applied to the various machine elements to produce thermal decomposition products before any of the normally present organic materials are affected. The circulating cooling gas entrains these decomposition products and carries them through the system as illustrated by arrows 30.

Figure 2:
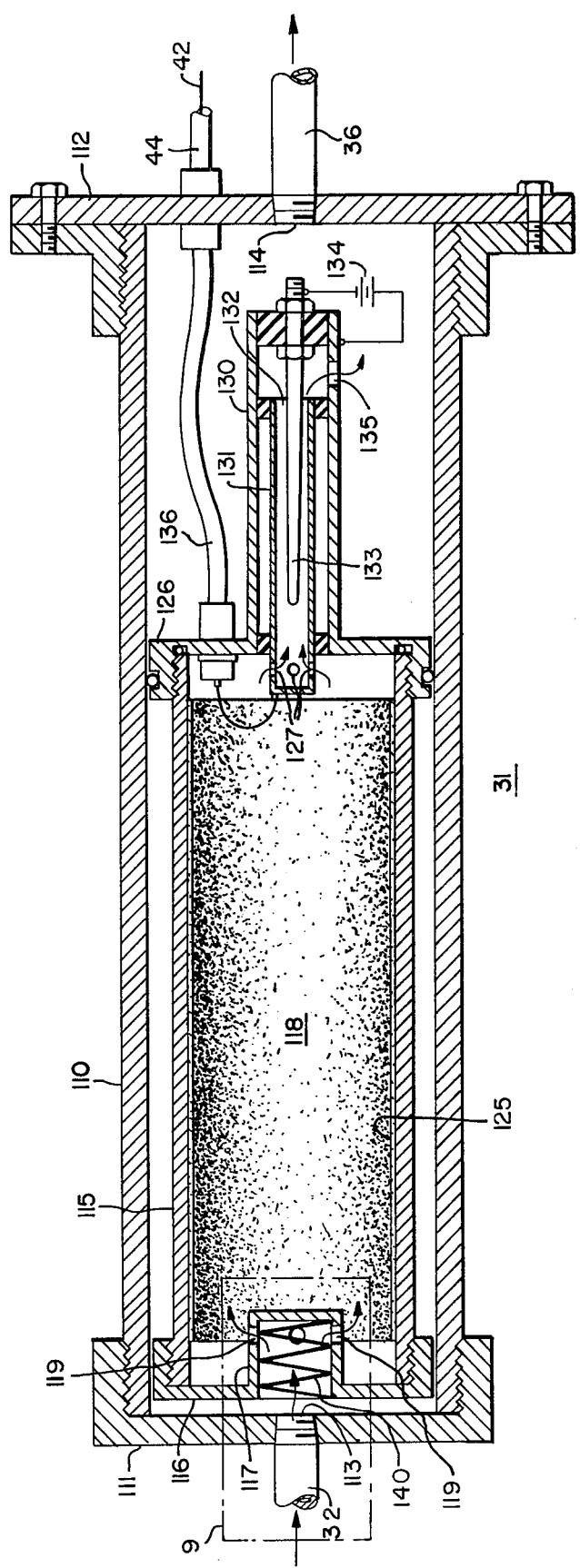
FIG. 2 is a schematic view of an ion chamber particulate detector and enhancement chamber suitable for use in the apparatus of FIG. 1.

The improved generator condition monitor which is used for detecting the presence of decomposition products in the dynamoelectric machine 10 comprises an enhancement chamber 9 and an ion chamber detector 31 as shown in FIGS. 1 and 2 of the drawings. A portion of "flow" of the cooling fluid is withdrawn from the high pressure side of the machine housing by conduit 32 having a suitable shutdown valve 34 connected in series fluid relation therewith. After passing through the detector, the fluid is directed back into the low pressure side of the dynamoelectric machine 10 by means of a return conduit 36 which also includes a shutdown valve 38. The detector 31 is electrically connected to an amplifier 40 by means of output conductors 42 and 44. The amplifier 40 may be of any suitable linear type and its output is connected to a recorder 46 by means of conductors 48 and 50.

The construction of the enhancement chamber or enhancer 9 and the ion chamber apparatus can best be seen by referring to FIG. 2 of the drawings where the numeral 110 indicates an elongated cylindrical body closed at opposite ends by caps 111 and 112. An inlet port 113 is provided through end cap 111 and similarly end cap 112 is provided at outlet opening 114. Within the volume defined by body 110 is an elongated container 115 which defines a delay volume 118 for receiving particulate bearing gas. This section formed by the body 115 is one in which thorough mixing of the incoming gas and carried particulates can take place as the gas is ionized by means of a source of radiation located within the container 115. It will be noted that the end of body 115 adjacent inlet opening 113 is closed by an end cap 116. The end cap 116 has a generally cup-shaped chamber 117 which causes the incoming gas and entrain particulates to pass over a corrugated platinum surface element 140 (e.g. an open mesh screen) and to enter the delay volume 118 in a turbulent fashion through openings 119. The enhancement chamber 9 consists of cup-shaped chamber 117 and platinum element 140.

The construction shown in FIG. 2 has the inner surface of the body 115 coated with a suitable radiation source indicated by the numeral 125.

The outlet end of delay volume 118 is closed by end cap 126 which has openings 127 through which the gas flows into the detector section, indicated generally by numeral 130. The detector section comprises an outer electrode 131 which has the openings 127 for admitting the gas-particulate mixture, an outlet opening 132 and a centrally located electrode 133 which is connected to an appropriate voltage source 134. The gas, after flowing between outer electrode 131 and central electrode 133 exits through the openings 135 and on through the outlet opening 114 in end cap 112.

The outer electrode 131 is electrically connected to a suitable sensing and amplifying means by means 136 comprising coaxial wires 42 and 44.

Figure 3A:
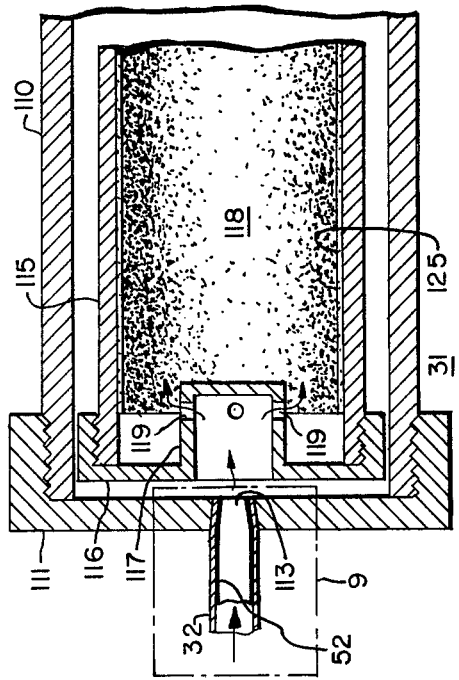
FIGS. 3A, 3B, 3C and 3D show alternate locations of the enhancement chamber.

FIG. 3A shows the alternative placement of the corrugated platinum surface element 140 within the inlet conduit 32. As a result of this location, the end cap 116 and the generally cup shaped chamber 117 acts only as a diffusion baffle which causes the incoming gas and the entrained particles to enter the delay volume 118 in a turbulent fashion through the openings 119.

Figure 3B:
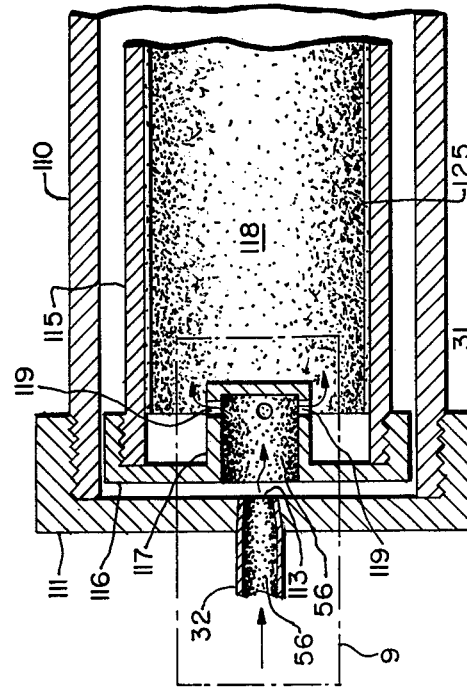

In FIG. 3B as a further alternative, the enhancement chamber 9 consists of the inlet conduit 32 having a platinum lining 52.

Figure 3C:
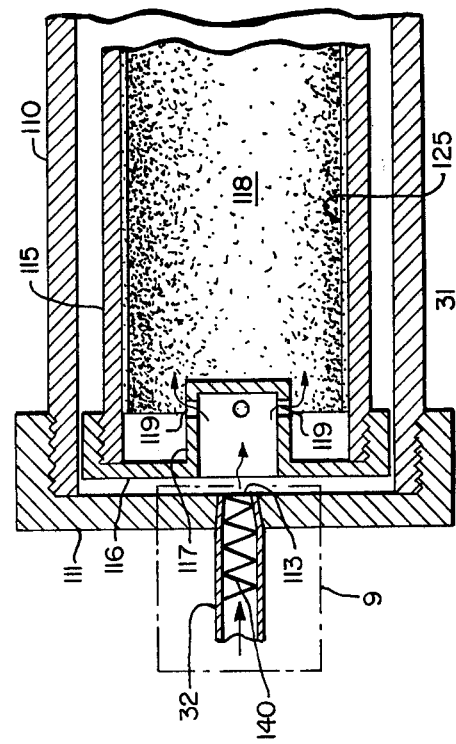

FIG. 3C shows a still further alternative with a combination of platinum surface elements 54A and 54B either within inlet conduit 32 and within the cup-shaped chamber 117, respectively. The platinum surface elements 54A and 54B in this case would be a disc-shaped insert made of a platinum mesh. Also, embodiments are suitable in which only one such element 54A and 54B is used.

Figure 3D:
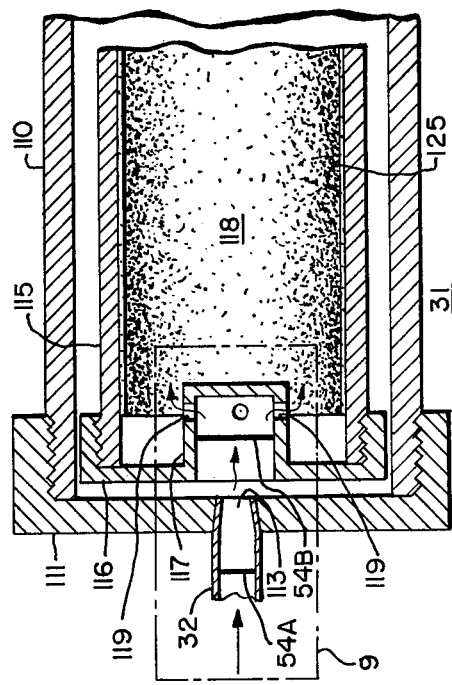

Platinum or platinum black powder 56 may be glued into the enhancement chamber 9 by a layer of epoxy resin leaving powder particles exposed, as shown in FIG. 3D. The surface of powder must be exposed to the gas to perform properly. The platinum powder can be placed in either or both the inlet conduit 32 and the cup-shaped chamber 117.

EXPERIMENTAL VERIFICATION OF PARTICULATE ENHANCEMENT

Figure 4:
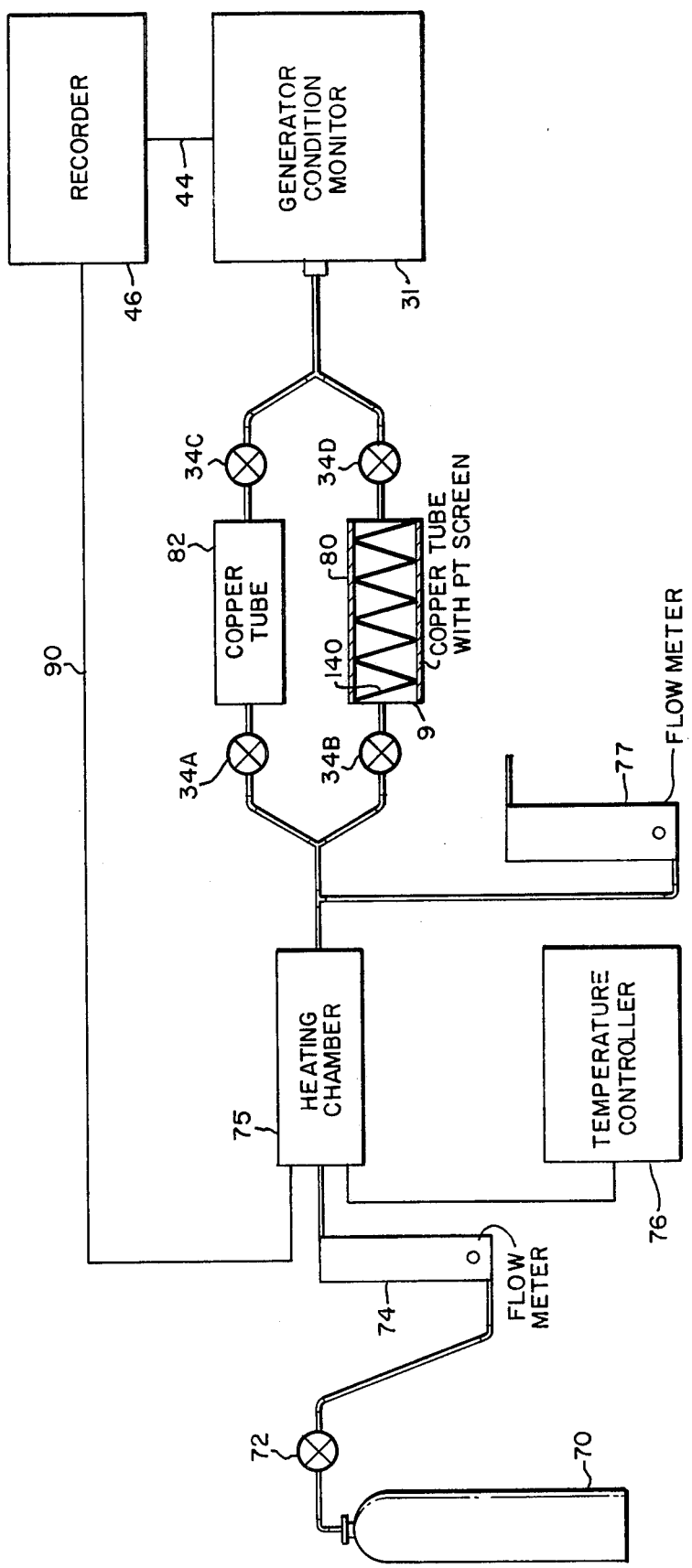
FIG. 4 is a schematic diagram of a laboratory system used to generate particulates and to verify the operation of the enhancement chamber.

The apparatus used to verify particulate enhancement by the practice of this invention is schematically shown in FIG. 4. A generator condition monitor 31 was paired with a simulated turbine generator section consisting of a heating chamber 75, a temperature controller 76, and a source of hydrogen gas 70. Chromel-alumel thermocouples measured the temperatures of samples in an aluminum cup (not shown) which rested directly on a strip heater (not shown) within the heating chamber 75. A $3"\times\frac{1}{2}"$ piece of platinum screen (45 mesh) 140 was inserted into a 4" piece of $\frac{1}{2}"$ i.d. copper tubing 80 in a corrugated or accordion fashion to form enhancement chamber 9. An identical copper tube 82 without the platinum screen was arranged in a parallel fashion to the enhancement chamber 9. A programmable linear temperature controller 76 controlled the rate of heating, normally 6° C./minute while a flow rate of 8 liters/minute of hydrogen gas was maintained through the stainless steel heating chamber 75 by flow meter 74 and control valve 72 and regulator 74. The outlet flow meter 77 acted as a pressure relief while reading 4 liter/minute of hydrogen.

Figure 5:
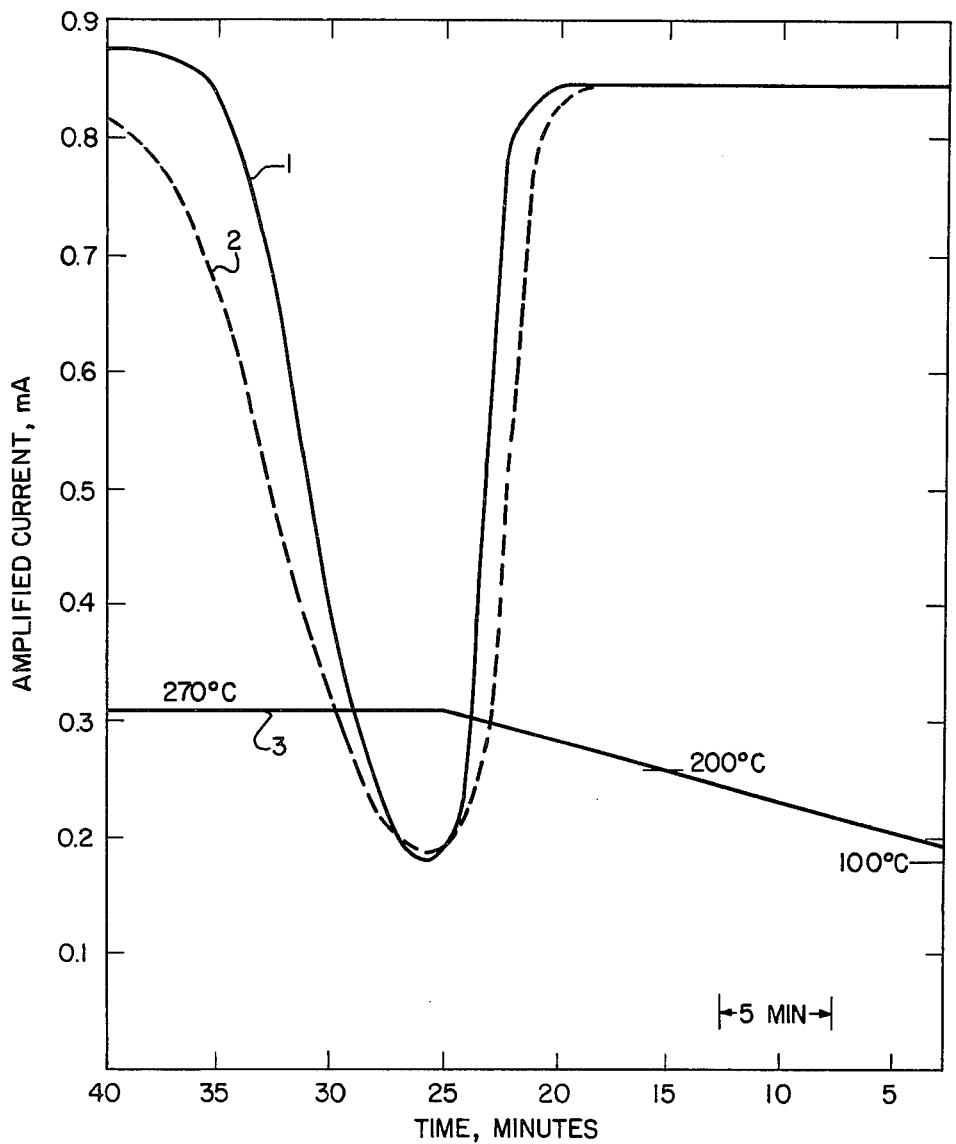
FIG. 5 is a comparison between the ion currents of a generator condition monitor with an enhancement chamber and without an enhancement chamber.

FIG. 5 shows the effect of the platinum enhancer on the ion current trace of the generator condition monitor 31. Curve 1 is the response of the generator condition monitor to 3 mg of alkyd resin heated at a rate of 6° C./minute up to a temperature of 270°. Curve 2 is a response of the generator condition monitor with the particulate enhancer to an exact amount of 3 mg of alkyd resin and the same heating rate of 6° C./minute up to the temperature of 270°. The temperature line is indicated by line 3. By comparing curve 1 to curve 2 it can be seen that not only is the signal detected at a lower temperature in the case where the platinum enhancer is present, but it also persists for a much longer time, indicating quite clearly that more particulates are being detected.

Three generator insulation materials were tested; these were materials containing alkyd resin, silicone rubber, and dacron/mica tape. In each case, a constant weight of materials (3 mgs) and heating rate (6° C./minute) were employed. In each two-run series by utilizing the flow-control valves 34A, 34B, 34C and 34D, the hydrogen stream was first allowed to flow through the tubing 82, and then through the particulate enhancement section 9. A conventional condensation nuclei monitor (not shown), was used in the position of the generator condition monitor 31 shown in FIG. 4, to obtain a direct reading of numbers of thermoparticulates generated under like conditions with and without the platinum multiplier in accordance with this invention. The monitor and the thermocouple outputs (not shown) were connected to a two-pen chart recorder 46 by means of wires 44 and 90. The thermocouple output and the monitor output on the chart recorder 46 were plotted and integrated to determine the measurable number of particulates emitted from the insulation materials in each run. The apparatus was heated to 500° C. between experiments to ensure that no particulates remained from a previous experiment.

The result of the three insulation materials studied are shown in Table 1.

TABLE 1

| Major Constituent | Total Number of Particulates | | Factor | % |
|---|---|---|---|---|
| | No Platinum | Pt Multipler | | |
| alkyd resin | 27,316,800 | 93,695,200 | 3.4 | 240 |
| silicone rubber | 15,700,000 | 36,891,600 | 2.3 | 130 |
| Dacron/mica tape | 23,108,400 | 29,241,193 | 1.3 | 30 |

From Table 1 it can be seen that a considerable increase in total particulates occurred when the "platinum enhancer" was present; the enhancement ranged from a factor of 1.3 for dacron/mica tape to a large factor of 3.4 for alkyd resin.

Other metal screens (3"×½", 45 mesh) were tested to ascertain if enhancement properties, similar to those found in platinum, were present. The results of those tests are listed in Table II and indicate that of all the metal screens tested, only the platinum screen exhibited enhancement properties.

The testing of the listed metal screens was performed under the identical conditions and procedures as those used for experimental verification of particulate enhancement, as described above in connection with the data of Table 1. In particular the test apparatus of FIG. 4 was used to particulate a 3 mg sample of alkyd resin for each test sample of metal screen. The programmable linear temperature controller 76 controlled the rate of heating, normally 6° C./minute, while a flow rate of 8 liters/minute of hydrogen was maintained through the stainless steel heating chamber 75. The apparatus was heated to 500° C. between testing of the metal screens to ensure that no particulates remained from a previous test.

TABLE II

| Test No. | Metal Screens 3" × ½" 45 mesh | Total Number of Particulates |
|---|---|---|
| 1 | Copper | $27.5 \times 10^6$ |
| 2 | Nickel | $26.9 \times 10^6$ |
| 3 | Iron | $27.3 \times 10^6$ |
| 4 | Silver | $28.1 \times 10^6$ |
| 5 | Aluminum | $27.1 \times 10^6$ |
| 6 | Zinc | $26.2 \times 10^6$ |
| 7 | Platinum | $93.7 \times 10^6$ |
| 8 | No metal screen | $27.3 \times 10^6$ |

It can be seen that the platinum enhancer increases the total number of particulates detected by the monitor. The larger number of particulates detected and the resulting signals produced from the detection will give an unequivocal indication of insulation overheating. A decision regarding load reduction or shut down of the dynamoelectric machine can be made very rapidly. As shown in FIG. 5 the temperature at which particulation is detected is lower than the platinum enhancer is used; hence, an earlier warning of overheating would be indicated with greater assurance of avoiding insulation damage.

I claim:

1. An apparatus for detecting submicron particulates in a gaseous carrier, said apparatus comprising;
    a particulate enhancement section which includes a platinum surface for said gaseous carrier to flow over whereby the number of submicron particulates in said gaseous carrier increases;
    a mixing and gas ionizing section, operably joined to said particulate enhancing section to receive said gaseous carrier and enhanced particulates therefrom, said mixing and gas ionizing section including means defining a delay volume for receiving the particulate bearing gas; and which also includes a source of radiation to effect ionization of the gaseous carrier; and
    a detector section operably joined to said mixing and gas ionizing section to receive the ionized gas and entrained particulates therefrom, said detector section including spaced electrodes having an applied voltage and between which current flow occurs by means of the ionized gas to produce a variable signal the magnitude of which is proportional to the amount of entrained particulates.

2. In combination, a dynamoelectric machine having portions coated with a material which particulates in response to heat;
    means for circulating a stream of cooling fluid over said machine portions to entrain said particulates;
    conduit means arranged to withdraw a test portion of said fluid during operation of said machine; and
    apparatus for sensing the presence of particulate material entrained in said exposed cooling fluid, said apparatus comprising;
    a chamber connected in fluid communication with said conduit means for receiving the flow of exposed cooling fluid, said chamber defining a flow path for the exposed cooling fluid and having a particulate enhancement section with a platinum surface for said exposed cooling fluid to flow over;
    means for mixing and ionizing said exposed and enhanced cooling fluid within said flow path; and
    said detector means arranged to monitor said ionized cooling fluid and provide in indication when said particulates are present.

3. A combination in accordance with claim 2 wherein: said platinum surface of said enhancement section is provided by an open mesh platinum screen.

4. A combination in accordance with claim 2 wherein: said platinum surface of said enhancement section is provided by a lining of platinum on the inner surface of said chamber.

5. A combination in accordance with claim 2 wherein: said platinum surface of said enhancement section is provided by a layer of resin having exposed particles of platinum therein.

6. A combination in accordance with claim 2 wherein: said platinum surface of said enhancement section is provided by a member of a platinum alloy.

7. Apparatus for detecting thermoparticulates in a gaseous carrier comprising:
    means for producing and detecting ions in the gaseous carrier related to the concentration of thermoparticulates therein; and
    means for enhancing the number of thermoparticulates detected by said first means, said means for enhancing comprising an element having a platinum surface over which said gaseous carrier passes prior to the production and detection of ions.

8. Apparatus in accordance with claim 7 wherein: said element having a platinum surface is an open mesh platinum screen.

9. Apparatus in accordance with claim 7 wherein: said element having a platinum surface is a platinum layer on a surface of a conduit carrying said gaseous carrier to said means for producing and detecting ions.

10. Apparatus in accordance with claim 7 wherein: said element having a platinum surface comprises a platinum powder.

11. Apparatus in accordance with claim 7 wherein: said element having a platinum surface comprises an alloy of platinum.

* * * * *